United States Patent [19]

Matsubara et al.

[11] Patent Number: 5,537,773
[45] Date of Patent: Jul. 23, 1996

[54] FISHING ROD HANDLE

[75] Inventors: Teiji Matsubara; Tomoyoshi Tsurufuji, both of Tokyo, Japan

[73] Assignee: Daiwa Seiko, Inc., Tokyo, Japan

[21] Appl. No.: 201,324

[22] Filed: Feb. 24, 1994

[30] Foreign Application Priority Data

Feb. 26, 1993 [JP] Japan .................................. 5-061335

[51] Int. Cl.$^6$ .................................................. A01K 87/06
[52] U.S. Cl. .................................................. 43/22; 43/23
[58] Field of Search .......................................... 43/22, 23

[56] References Cited

U.S. PATENT DOCUMENTS

| | | | |
|---|---|---|---|
| 1,980,317 | 11/1934 | Clark | 43/22 |
| 2,753,646 | 7/1956 | Colmery | 43/22 |
| 2,777,240 | 1/1957 | Hutchinson | 43/22 |
| 4,355,480 | 10/1982 | Morishita | 43/22 |
| 4,516,351 | 5/1985 | Highby | 43/23 |
| 4,646,462 | 3/1987 | Ohmura | 43/23 |
| 4,653,217 | 3/1987 | Ohmura | 43/20 |
| 5,048,223 | 9/1991 | Yamamoto | 43/22 |
| 5,291,683 | 3/1994 | Yamamoto | 43/23 |
| 5,291,684 | 3/1994 | Oyama | 43/22 |

FOREIGN PATENT DOCUMENTS

| | | |
|---|---|---|
| 59-122067 | 8/1984 | Japan . |
| 1-82765 | 6/1989 | Japan . |
| 4-74960 | 6/1992 | Japan . |

Primary Examiner—Jack W. Lavinder
Assistant Examiner—James Miner
Attorney, Agent, or Firm—Longacre & White

[57] ABSTRACT

The present disclosure concerns a fishing rod handle which, when holding the fishing rod at a position forward of its normal holding position (e.g. between the reel and the tip of the fishing rod), allows the fishing rod to be held stably, thereby improving the ability to manipulate the fishing rod. The handle includes a reel leg mounting portion 18 which locates the legs 14A,14B of a reel 14 on a reel leg placement surface 18B and fixes the reel legs 14A,14B with front and rear hoods 12A,12B. The reel leg mounting portion further includes a reduced portion 18C diametrically opposite the reel leg placement surface 18B. An expanded portion 22 is located between the reduced portion 18C and a constricted portion 20C, and swells generally oppositely from the reel leg placement surface 18B. The extended portion 22 is contoured and sized so as to be readily and comfortably received in the palm of an angler's hand.

6 Claims, 2 Drawing Sheets

FISHING ROD HANDLE

BACKGROUND OF THE INVENTION a) Field of the Invention

The invention concerns a fishing rod handle particularly contoured and sized to facilitate operating the fishing rod. That is, easily holding the fishing rod in a manner well suited to detect a fish taking the bait, which may be further facilitated if the angler can readily touch the fishline in addition to the holding the fishing rod.

b) Description of Related Art

Japanese Utility Model Publication No. 59-122067 to Showa, and Japanese Utility Model Publication No. 1-82765 to Heisei disclose handles wherein an auxiliary rod is employed or the transverse section of the handle is formed in an arc shape in order to improve the feeling and operating stability of the rod while holding the handle in the palm of an angler's hand.

It is common for an angler to grasp a fishing rod, holding on to a surface where the rear reel leg is received by the fishing rod. If an angler wants to touch the fishline in addition to holding the fishing rod, or, if the angler wants to hold the fishing rod at a forward position of the reel (e.g. where the front reel leg is received by the fishing rod) so as to approach the usual center of gravity for a fishing rod including a reel, conventional fishing rod handles cannot be held stably.

SUMMARY OF THE INVENTION

The objective of the present invention is to overcome the drawbacks in the aforementioned conventional fishing rod handles. Accordingly, it is an object of the invention to provide a fishing rod handle which can be held stably in more positions, thus easing operation of the fishing rod.

To attain the above and other objects, the fishing rod handle according to the present invention includes: a reduced portion formed diametrically opposite a reel leg placement surface (this exposes the fishing rod between the front and rear hoods fixing the reel legs to the reel leg placement surface); a constricted portion generally opposite the reduced portion with respect to the front hood; and, an expanded portion (i.e. an enlarged diameter with respect to the longitudinal axis of the fishing rod) between the reduced and constricted portions and sized to be comfortably received in the palm of the angler's hand.

The reduced portion provides a standard holding position during normal operation of the fishing rod. Further, when an angler wants to grasp the fishing rod in front of the reduced portion, the angler moves their middle finger and/or index finger forward of the expanded portion into the constricted portion and places at least their little finger in the reduced portion such that the angler's palm receives the expanded portion. This provides an additional stable position which the angler may use to hold the fishing rod.

DESCRIPTION OF THE PREFERRED EMBODIMENT

Figure 1:
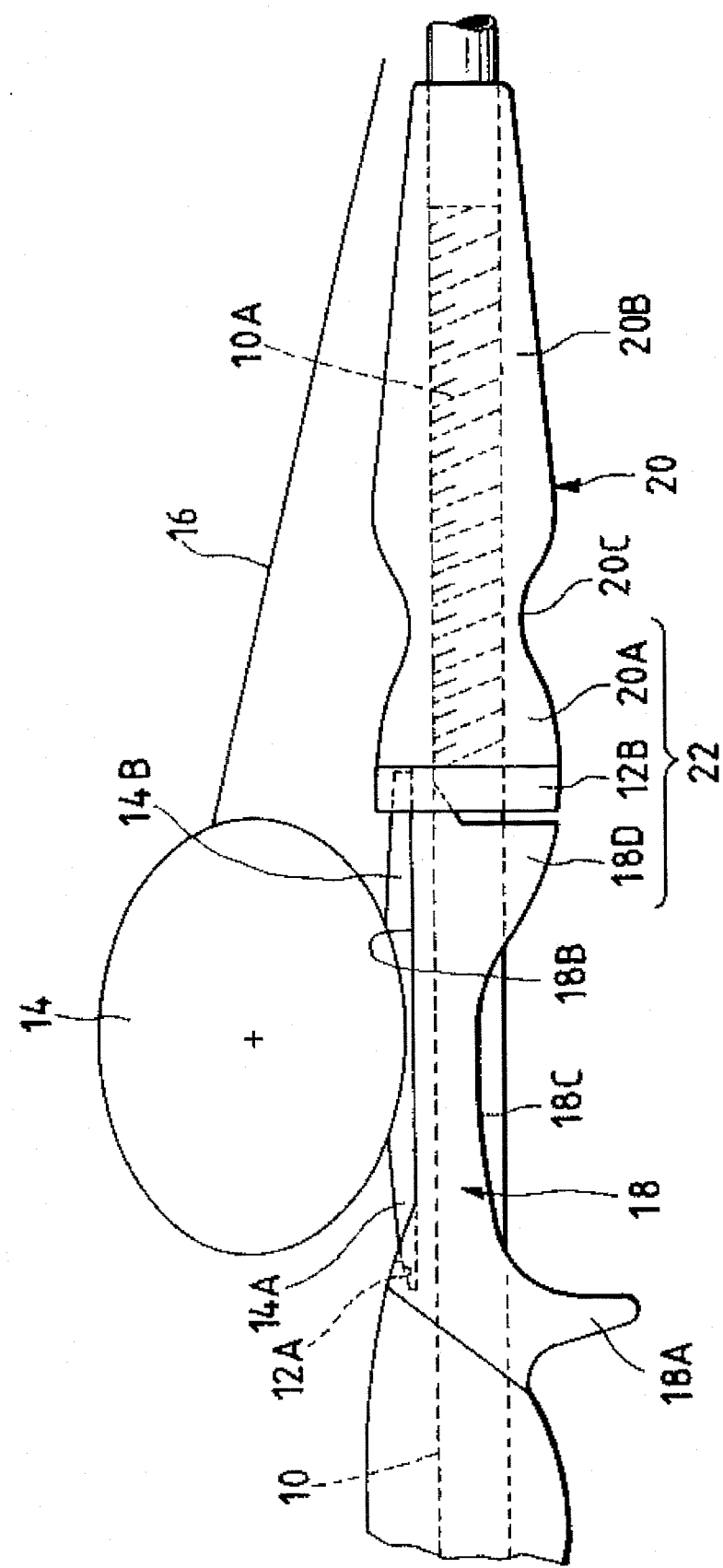
FIG. 1 is a side view of a first embodiment of a fishing rod handle according to the present invention.

FIG. 1 shows a fishing rod handle according to the present invention including a reel leg mounting member 18 which is a component of a reel leg mounting arrangement. Reel leg mounting member 18 includes an upper reel leg placement surface 18B receiving rear reel leg 14A and front reel leg 14B when fixing a reel 14 to a rod tube 10. The reel leg mounting member 18 includes a trigger 18A substantially longitudinally proximate and diametrically opposite with respect to the rear reel leg 14A. A reduced portion 18C diametrically opposite the reel leg placement surface 18B exposes the rod tube 10 extending through the reel leg mounting member 18. This allows an angler to directly touch the rod tube 10, thereby improving the angler's ability to sense a fish taking the bait.

A fixed hood 12A at the rear of the reel leg placement surface 18B engages and retains the reel leg 14A on the reel leg placement surface 18B. A moving hood 12B at the front of the reel leg placement surface 18B is translatable along the longitudinally axis of the rod tube 10. A moving member 20 having female threads (not shown) formed on an inner peripheral portion thereof engages male threads 10A formed directly on, or attached to, the outside of the rod tube 10. The moving hood 12B is longitudinally translatable in response to relative rotation between the threads 10A and moving member 20. The moving hood 12B engages and retains the reel leg 14B on the reel leg placement surface 18B, thereby fixing the reel 14 to the rod tube 10 between fixed and moving hoods 12A, 12B.

The moving member 20 includes a nut portion 20A, a grip portion 20B, and a constricted portion 20C interposed between the nut and grip portions 20A, 20B. The expanded portion 22 includes the nut portion 20A, the moving hood 12B and a front portion 18D of the reel mounting member 18. The expanded portion 22 is situated between the reduced portion 18C and the constricted portion 20C, and, as shown in the drawings, swells outward from the longitudinal axis of rod tube 10 in a generally smooth contour particularly suited to being received in the palm of an angler's hand. Whereas the moving hood 12B and the nut portion 20A circumscribe the rod tube 10 with a generally uniform cross-section, the reel leg mounting member front portion 18D primarily bulges diametrically opposite to the reel leg placement surface 18B.

According to the first embodiment of the present invention, during normal operation of the fishing rod, the trigger 18A is held by and/or between the little and third fingers, and the reduced portion 18C is held with the index and middle fingers thereby placing the angler's hand in direct contact with the rod tube 10.

With tension applied to a fishline 16 during fishing, an angler may wish to improve their ability to sense a fishing taking the bait by touching the fishline 16 directly. Also, since the center of gravity of a fishing rod including a reel is usually forward of the reel, supporting the rod tube 10 forward of the reel 14 may improve the ease of operating the fishing rod. In these instances, the present invention allows the angler to detach their hand from the trigger 18A and move forward of the aforementioned normal holding position. In particular, the reduced portion proximate the front reel leg 14B, the expanded portion 22, as well as the constricted portion 20C and/or the rear portion of the grip portion 20B are held by the angler's hand.

In the latter case, the index and middle fingers are placed in the constricted portion 20C against the forward portion of the expanded portion 22 (i.e. the nut portion 20A) to stabilize the fishing rod while angling. At the same time, the tips of the thumb and/or index finger may be placed in direct contact with the fishing line 16. Further, since the fishing rod is held at a position nearer to its center of gravity, the ease by which the fishing rod is manipulated can be improved.

Essentially, the expanded portion 22 and the constricted portion 20C cooperatively establish a projection upon which the index and/or middle fingers are retained. Therefore, the expanded portion 22 may alternatively have such a downwardly projecting shape as the trigger 18A.

Further, the grip portion 20B may be grasped by the angler's second hand to provide additional means for pulling on the fishing rod while reeling in a catch. In the case where the fishing rod according to the present invention is grasped at the "normal" (rear) position, the little finger of the angler's second hand may be received in the constricted portion 20C so that the angler's second hand is able to stably hold the grip portion 20B while pulling on the fishing rod.

Figure 2:
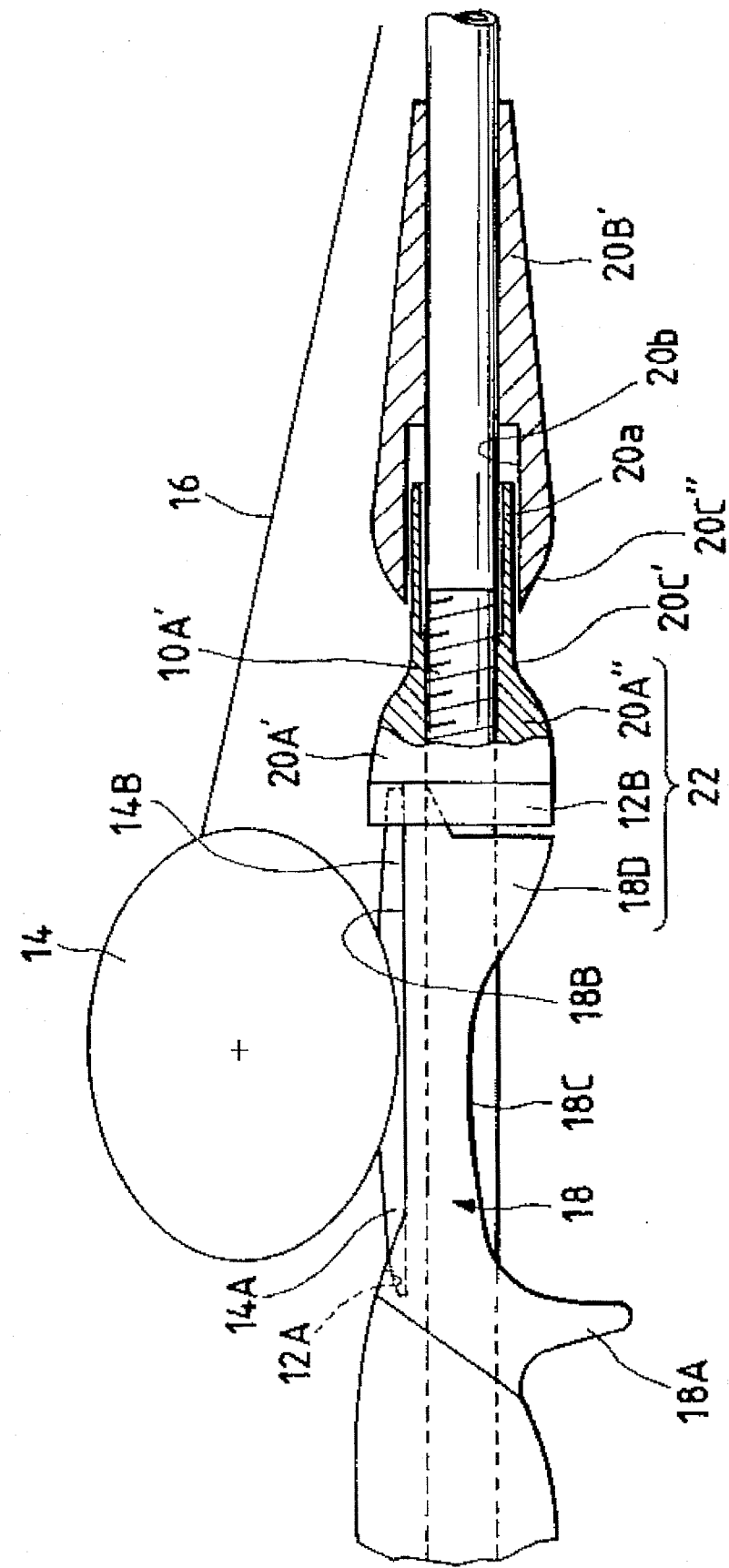
FIG. 2 is a partial section side view of a second embodiment of a fishing rod handle according to the present invention.

Referring next to FIG. 2, a second embodiment of a fishing rod handle according to the present invention is shown. The second embodiment differs from the first embodiment in that the moving member 20 of the first embodiment is divided into a nut member 20A' and a grip 20B'. Nut member 20A' is used to translate the moving hood 12B along the longitudinal axis of the rod tube 10. The grip 20B' is fixed to the rod tube 10 and includes an axially extending recess 20b formed concentrically with the axis of the rod tube 10.

The nut member 20A' includes female threads (not shown) formed on an inner peripheral portion of a large diameter portion 20A" at the rear of the nut member 20A'. The female threads engage the male threads 10A formed directly on, or attached to, the outside of the rod tube 10. The front portion of the nut member 20A' includes a cylindrical portion 20a having an external diameter sized to be received within the recess 20b. Therefore, the aforementioned threaded engagement between the male and female threads allows the nut member 20A' to advance and retreat, and concurrently the cylindrical portion 20a is translated within the hole 20b.

The longitudinal cross-section of the nut member 20A' in the region extending between the cylindrical portion 20a and the large diameter portion 20A" of the nut member 20A' is formed as a first smooth, continuous curve 20C'. Further, the grip 20B' includes a second smooth, continuous curve 20C" tapering to a reduced diameter at a rear terminus of the grip 20B'. The two smooth, continuous curves 20C', 20C" perform a similar operation to the constricted portion 20C employed in the first embodiment.

The cylindrical portion 20a serves as a cover to prevent the angler's hands from touching the male threads 10A', however, the cylindrical portion 20a is not always necessary.

The large diameter portion 20A" of the nut member 20A' when it is fixed with respect to the rod tube 10 and in combination with the moving hood 12B and the front portion 18D of the reel leg mounting member 18, cooperate in forming the expanded portion 22.

Although the depicted embodiments the grips 20B and 20B' are formed in a uniform spindle shape, it is also possible to form the grip such that the longitudinal section thereof has a wave shape to accommodate the fingers of the angler's second hand. Further, the grips 20B and 20B' as well as the nut portions 20A or 20A' may also be formed or covered with cork or the like.

Moreover, although the reduced and constricted portions 18C, 20C', 20C" have been depicted as formed with smooth curves, they may also be formed with stepped longitudinal cross-sections. This can provide further security while holding the fishing rod.

As can be seen clearly from the foregoing description, the present invention provides a fishing rod handle which, when holding the fishing rod at a position forward of the normal holding position, enables the angler's fingers to be received in a constricted portion, thereby enabling the fishing rod to be held stably. Also, because the holding hand approaches the center of gravity of the fishing rod, the ease by which the fishing rod is manipulated can be improved.

What is claimed is:

1. A fishing rod handle generally circumscribing a rod tube which has a longitudinal axis extending from a front tip of said rod tube to a rear but of said rod tube, said handle comprising:

reel leg mounting means for locating and fixing legs of a reel on a reel leg placement surface of said handle, said reel leg mounting means including front and rear hoods;

a reduced portion diametrically opposite said reel leg placement surface with respect to said longitudinal axis;

thread means for longitudinally displacing said front and rear hoods with respect to one another upon relative rotation of said front and rear hoods, said thread means including a nut member affixed to said front hood which is rotatable with respect to said rod tube;

a constricted portion between said reduced portion and said tip of said rod tube, said constricted portion circumscribes said rod tube and is exposed to receive a hand of an angler; and, an expanded portion extending longitudinally on either side of said front hood and said nut member in a smooth contour between said reduced and constricted portions, said expanded portion extends radially outward from said longitudinal axis further than said reduced and constricted portions.

2. The fishing rod handle according to claim 1, further comprising:

a trigger longitudinally interposed between said reduced portion and said butt of said rod tube.

3. The fishing rod handle according to claim 1, further comprising:

a grip longitudinally interposed between said constricted portion and said tip of said rod tube, said grip being radially larger than said constricted portion.

4. The fishing rod handle according to claim 3, wherein said expanded portion includes threaded nut means for longitudinally displacing said front and rear hoods with respect to one another upon relative rotation between said rod tube and said nut means, said nut is relatively rotatable with respect to said grip, and said grip is relatively fixed with respect to said rod tube.

5. A fishing rod handle generally circumscribing a rod tube which has a longitudinal axis extending from a front tip of said rod tube to a rear butt of said rod tube, said handle comprising:

reel leg mounting means for locating and fixing legs of a reel on a reel leg placement surface of said handle, said reel leg mounting means including front and rear hoods;

a reduced portion diametrically opposite said reel leg placement surface with respect to said longitudinal axis;

a constricted portion between said reduced portion and said tip of said rod tube;

a grip longitudinally interposed between said constricted portion and said tip of said rod tube, said grip being radially larger than said constricted portion; and an expanded portion extending longitudinally on either side of said front hood in a smooth contour between said reduced and constricted portions, said expanded portion extends radially outward from said longitudinal axis further than said reduced and constricted portions;

wherein said expanded portion includes threaded nut means for longitudinally displacing said front and rear hoods with respect to one another upon relative rotation between said rod tube and said nut means, said nut is relatively rotatable with respect to said grip, and said grip is relatively fixed with respect to said rod tube, and wherein said threaded nut means includes a longitudinally extending cylinder circumscribing said rod tube, and said grip includes a longitudinally extending recess receiving said cylinder, wherein said cylinder is radially interposed between said rod tube and said grip.

6. A fishing rod handle generally circumscribing a rod tube which has a longitudinal axis extending from a front tip of said rod tube to a rear butt of said rod tube, said handle comprising:

reel leg mounting means for locating and fixing legs of a reel on a reel leg placement surface of said handle, said reel leg mounting means including front and rear hoods;

a reduced portion diametrically opposite said reel leg placement surface with respect to said longitudinal axis, said rod tube is exposed by said reduced portion on either longitudinal side of said reel;

a curved contoured constricted portion to receive the fingers of a user, said constricted portion between said reduced portion and said tip of said rod tube;

a grip longitudinally interposed between said constricted portion and said tip of said rod tube, said grip rotatably disposed on said rod tube and being radially larger than said constricted portion;

thread means for longitudinally displacing said front and rear hoods with respect to one another upon relative rotation between said rod tube and said grip; and an expanded portion interposed longitudinally between said reduced and constricted portions, said expanded portion extends radially outward from said longitudinal axis further than said reduced and constricted portions.

* * * * *